United States Patent
Yoshizawa

(10) Patent No.: US 7,865,635 B2
(45) Date of Patent: Jan. 4, 2011

(54) BUFFER DEVICE, BUFFER ARRANGEMENT METHOD, AND INFORMATION PROCESSING APPARATUS

(75) Inventor: Shuichi Yoshizawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 116 days.

(21) Appl. No.: 12/230,111

(22) Filed: Aug. 22, 2008

(65) Prior Publication Data

US 2008/0320184 A1 Dec. 25, 2008

Related U.S. Application Data

(63) Continuation of application No. PCT/JP2006/303443, filed on Feb. 24, 2006.

(51) Int. Cl.
*G06F 13/00* (2006.01)
*G06F 9/02* (2006.01)

(52) U.S. Cl. .................. 710/52; 710/305; 712/E9.002; 257/208

(58) Field of Classification Search ........................ None
See application file for complete search history.

(56) References Cited

U.S. PATENT DOCUMENTS

| | | | |
|---|---|---|---|
| 4,962,037 A | * | 10/1990 | Jett et al. ........................ 435/6 |
| 5,197,145 A | | 3/1993 | Kitamura et al. |
| 2004/0210738 A1 | | 10/2004 | Kato et al. |

FOREIGN PATENT DOCUMENTS

| | | |
|---|---|---|
| JP | 2-82330 | 3/1990 |
| JP | 11-167522 | 6/1999 |
| JP | 2000-188381 | 7/2000 |
| JP | 2001-51957 | 2/2001 |

OTHER PUBLICATIONS

Japanese Office Action issued on Apr. 1, 2009 in corresponding Japanese Patent Application 2008-501541.
International Search Report for PCT/JP2006/303443, mailed Nov. 21, 2006.

* cited by examiner

*Primary Examiner*—Ilwoo Park
(74) *Attorney, Agent, or Firm*—Fujitsu Patent Center

(57) ABSTRACT

A buffer device that transfers data and is shared by a plurality of CPU cores arranged in a symmetrically inverted manner about a predetermined reference line, each CPU core breaking up a data block into a plurality of data lines and outputting the data lines via a plurality of ports, includes a plurality of line buffers that correspond to the data lines and are connected to the ports in the CPU cores, wherein the line buffers are paired into line buffer groups, and the line buffers in each buffer group are arranged symmetrically about the reference line.

7 Claims, 6 Drawing Sheets

BUFFER DEVICE, BUFFER ARRANGEMENT METHOD, AND INFORMATION PROCESSING APPARATUS

CROSS REFERENCE TO RELATED APPLICATIONS

This is a continuing application, filed under 35 U.S.C. §111(a), of International Application PCT/JP2006/303443, filed Feb. 24, 2006, the contents of which are incorporated herein by reference.

BACKGROUND OF THE INVENTION

1. Field of the Invention

The present invention relates to a buffer device, a buffer arrangement method, and an information processing apparatus.

2. Description of the Related Art

A data buffer (hereinafter, 'buffer device') is conventionally used for data transfer between a central processing unit (CPU) core and a peripheral device (such as a cache memory or an external interface). The buffer device serves to absorb the difference in the bus width between the data paths of the data source and the data destination as well as to temporarily store a plurality of pieces of transfer data.

With the ongoing improvement of the processing speed of the CPU core, the demand has been increasing for improving the data transfer speed between the CPU core and the peripheral devices. Various technologies, such as parallelization of data transfer and parallelization of line buffers built in a buffer device, have been proposed to enhance the data transfer speed.

For example, Japanese Patent Application Laid-open No. H02-82330 discloses a technology wherein a buffer device is provided between a CPU core and a peripheral device (such as a cache memory or an external interface) for transferring data that is divided into a plurality of lines to be output in parallel by the CPU core to the peripheral device after buffering the data in a plurality of line buffers provided for each line.

However, the technology is described on the premise that there is only one CPU core. Sharing one buffer device by a plurality of CPU cores may cause the difference in length of wirings connecting between each CPU core and the line buffers, which results in having an adverse effect on the processing speed of the CPU cores. Specifically, the data transfer speed is greater for shorter wiring lengths. If there are varying wiring lengths, the data transfer speed needs to be adjusted to suit the longest wiring length.

For example, when there are two CPU cores A and B, if the longest wiring length A between a CPU core A and the line buffers is not equal to the longest wiring length B between a CPU core B and line buffers is B, the data transfer rate has to be reduced to suit the greater of the longest wiring lengths A and B.

To enhance the reliability of a CPU chip, it is preferable to minimize interference of wirings with each other by reducing their number. However, wiring interference is a natural consequence of a plurality of CPU cores sharing a buffer device.

Therefore, it is a challenge to realize a buffer device shared by a plurality of CPU cores in which the difference in the wiring length is minimized and wiring interference between the wirings connecting the CPU core and the line buffers is reduced.

SUMMARY OF THE INVENTION

It is an object of the present invention to at least partially solve the problems in the conventional technology.

According to an aspect of the present invention, there is provided a buffer device that transfers data and is shared by a plurality of CPU cores arranged in a symmetrically inverted manner about a predetermined reference line, each of the CPU cores breaking up a data block into a plurality of data lines and outputting the data lines via a plurality of ports, the buffer device including a plurality of line buffers that correspond to the data lines and are connected to the ports in the CPU cores, wherein the line buffers are paired into line buffer groups, and the line buffers in each of the buffer groups are arranged symmetrically about the reference line.

According to another aspect of the present invention, there is provided a buffer arrangement method for a buffer device that transfers data, is shared by a plurality of CPU cores arranged in a symmetrically inverted manner about a predetermined reference line, each of the CPU cores breaking up a data block into a plurality of data lines and outputting the data lines via a plurality of ports, and includes a plurality of line buffers that correspond to the data lines and are connected to the ports in the CPU cores, the buffer arrangement method including pairing the line buffers into line buffer groups; and arranging the line buffers in each of the buffer groups symmetrically about the reference line.

According to still another aspect of the present invention, there is provided an information processing apparatus including the above buffer device.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments according to the present invention are explained in detail below with reference to the accompanying drawings. In the following explanation, a buffer device is provided in a CPU chip with two CPU cores mounted thereon.

Figure 1:
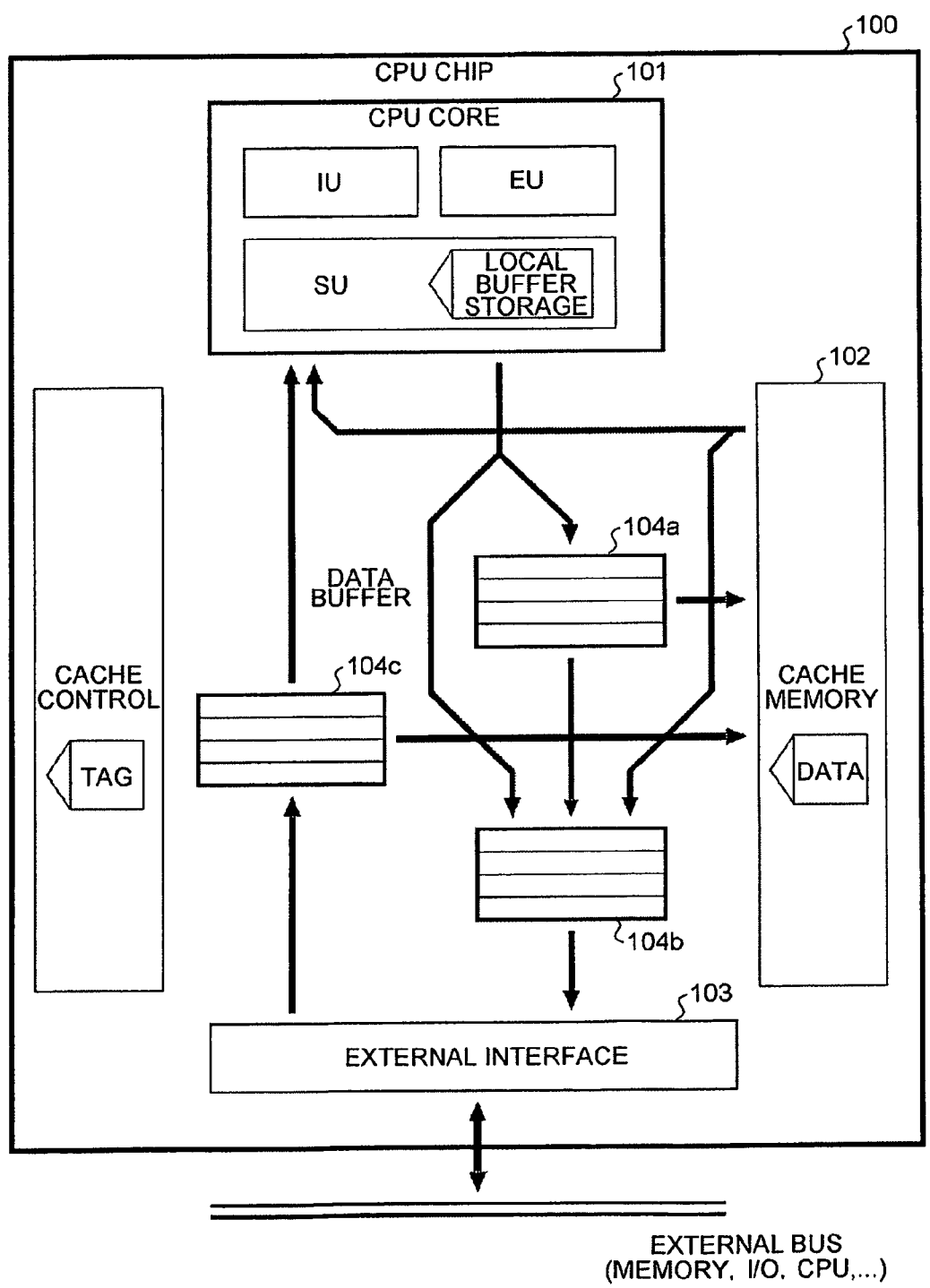
FIG. 1 is a block diagram of a configuration of an information processing apparatus that includes a buffer device.

Application of the buffer device and arrangement of elements on the CPU chip are explained with reference to FIG. 1. FIG. 1 is a block diagram of a configuration of the information processing apparatus that includes buffer devices 104a to 104c according to an embodiment. As shown in FIG. 1, a CPU chip 100 includes a CPU core 101, a cache memory 102, and an external interface 103, all of which are arranged on a substrate. The buffer devices 104a to 104c are provided between the CPU core 101, the cache memory 102, and the external interface 103. Data is exchanged between the CPU core 101, the cache memory 102, and the external interface 103 via the buffer devices 104a to 104c. The CPU chip 100 has only one CPU core 101.

The buffer device generally refers to a device that absorbs the difference in the bus width between the data path from the data source and the data path to the data destination and temporarily stores the transferred data. The buffer device conventionally includes a plurality of buffers for transferring the data in parallel. According to the embodiment of the present invention, the buffers and the wirings in the buffer device are arranged so that data transfer efficiency is enhanced.

The buffer device 104a that buffers the data transferred from the CPU core 101 to the cache memory 102 is taken as an example in the following explanation.

Figure 5:
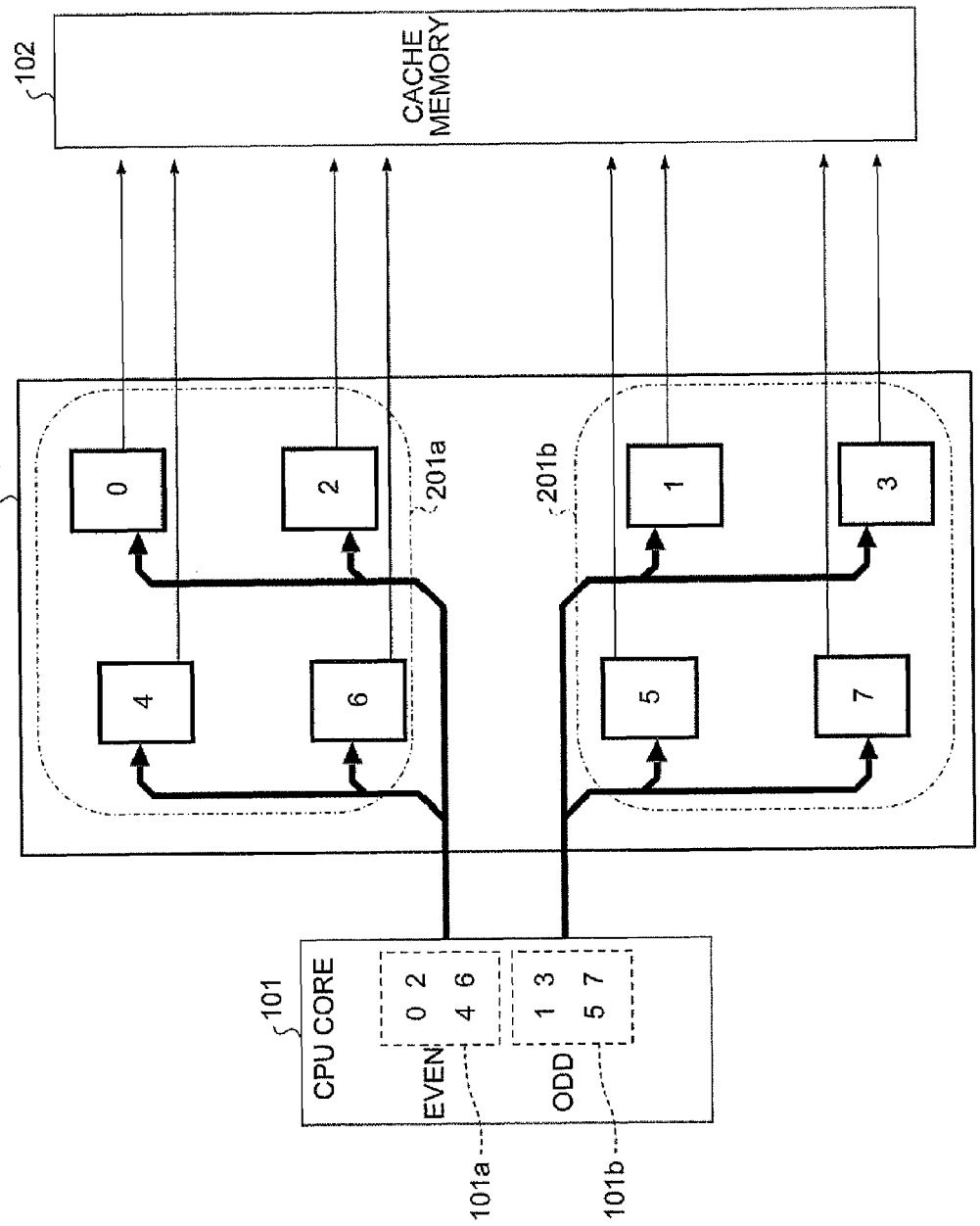
FIG. 5 is a schematic diagram representing a conventional buffer arrangement in a buffer device used by a single CPU core.
Figure 6:
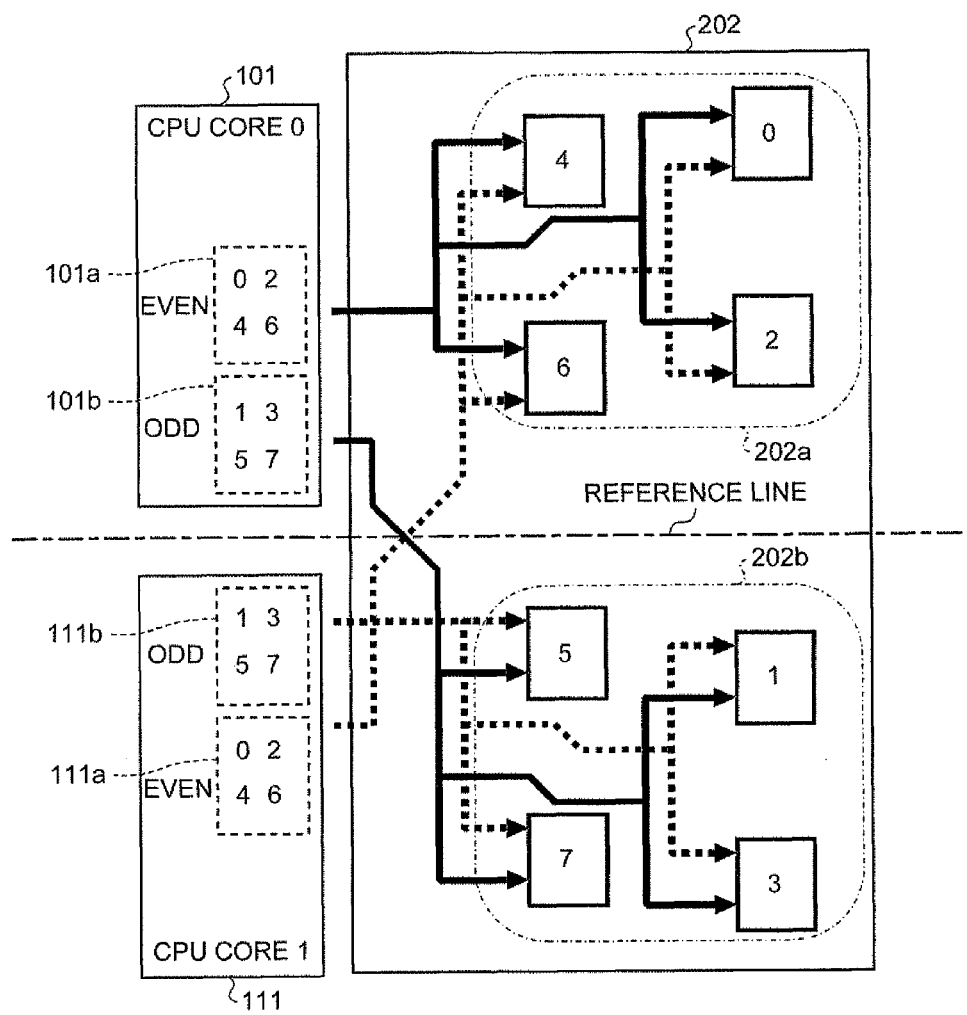
FIG. 6 is a schematic diagram representing another conventional buffer arrangement in a buffer device shared by two CPU cores.

A conventional buffer arrangement is first explained with reference to FIGS. 5 and 6 before explaining the buffer arrangement method according to the embodiment of the present invention. FIG. 5 is a schematic diagram representing a conventional buffer arrangement in a buffer device 201 used by a single CPU core 101, and FIG. 6 is a schematic diagram representing another conventional buffer arrangement in a buffer device 202 shared by two CPU cores 101 and 111.

As shown in FIG. 5, the buffer device 201 is provided between the CPU core 101 and the cache memory 102. The data from the CPU core 101 is transferred to the cache memory 102 via an even-number port 101a and an odd-number port 101b of the CPU core 101. For example, the CPU core 101 divides a 64-byte data block into eight lines of eight bytes and transfers them to the cache memory 102 via the even-number port 101a and the odd-number port 101b. The buffer device 201 has eight buffers (hereinafter, "line buffers") corresponding to each line for buffering the data output from the CPU core 101.

A unit of data transfer taking place from the CPU core 101 to the cache memory 102 via the buffer device 201 is explained below in greater detail. Assuming that the unit of data transfer (hereinafter, "data block") is 64 bytes. The CPU core 101 breaks up the 64-byte data block into units of eight bytes that represent eight lines, namely line 0, line 1, line 2, and so on up to line 7 in ascending order of address.

The CPU core 101 outputs the 64-byte data block in four cycles via a 16-byte wide data path formed by the even-number port 101a (8-byte wide data path) and the odd-number port 101b (8-byte wide data path). In other words, data in the lines 0 and 1, 2 and 3, 4 and 5, and 6 and 7 is simultaneously output via the even-number port 101a and the odd-number port 101b. The 64-byte data stored in the line buffers of the buffer device 201 is output to the cache memory 102 at the same time in one cycle.

The data output from the even-number port 101a (the port that outputs the lines 0, 2, 4, and 6) of the CPU core 101 is transferred to the cache memory 102 from an even-number line buffer group 201a (formed by line buffers 0, 2, 4, and 6). The data output from the odd-number port 101b (the port that outputs the lines 1, 3, 5, and 7) of the CPU core 101 is transferred to the cache memory 102 from an odd-number line buffer group 201b (formed by line buffers 1, 3, 5, and 7).

The wiring connecting each port of the CPU core 101 and each line buffer of the buffer device 201 is simple with hardly any difference between the wiring lengths. However, if a buffer device shared by two CPU cores is configured by using the configuration of line buffers same as that shown in FIG. 5, problem arises as explained below referring to FIG. 6.

As shown in FIG. 6, the buffer device 202 shared by two CPU cores 101 and 111 includes the line buffers 0 to 7 in the same manner as the buffer device 201 shown in FIG. 5. Each line buffer is connected to both the CPU cores 101 and 111.

As shown in FIG. 6, the wirings connecting the CPU core 101 and the line buffers are represented by solid lines and the wirings connecting the CPU core 111 and the line buffers are represented by dashed lines. The CPU cores 101 and 111 are arranged in a symmetrically inverted manner about a reference line adjacent to the CPU cores 101 and 111 so that the CPU cores 101 and 111 oppose an interface unit (not shown) provided near the CPU cores 101 and 111.

If the arrangement of the line buffers in the buffer device 202 is similar to that in the buffer device 201 shown in FIG. 5, the wiring length between the even-number port 101a and an even-number line buffer group 202a is overall short, while the wiring length between an even-number port 111a of the CPU core 111 and the even-number line buffer group 202a is overall long. Similarly, the wiring length between the odd-number port 101b of the CPU core 101 and an odd-number line buffer group 202b is overall long, while the wiring length between an odd-number port 111b of the CPU core 111 and the odd-number line buffer group 202b is overall short. Thus, there is a significant difference in length of the wirings between the CPU cores 101 and 111 and the line buffers. As the data has to be queued to suit the longest wiring length, there is a resultant slowing in the data transfer speed. Also, as shown in FIG. 6, the wirings connecting each of the ports to the line buffers are not symmetrical about the reference line.

In the buffer arrangement method according to the embodiment, the line buffers are arranged to minimize difference in the wiring length. Consequently, a buffer device can be realized that enables fast data transfer even if it is shared by a plurality of CPU cores.

Figure 2:
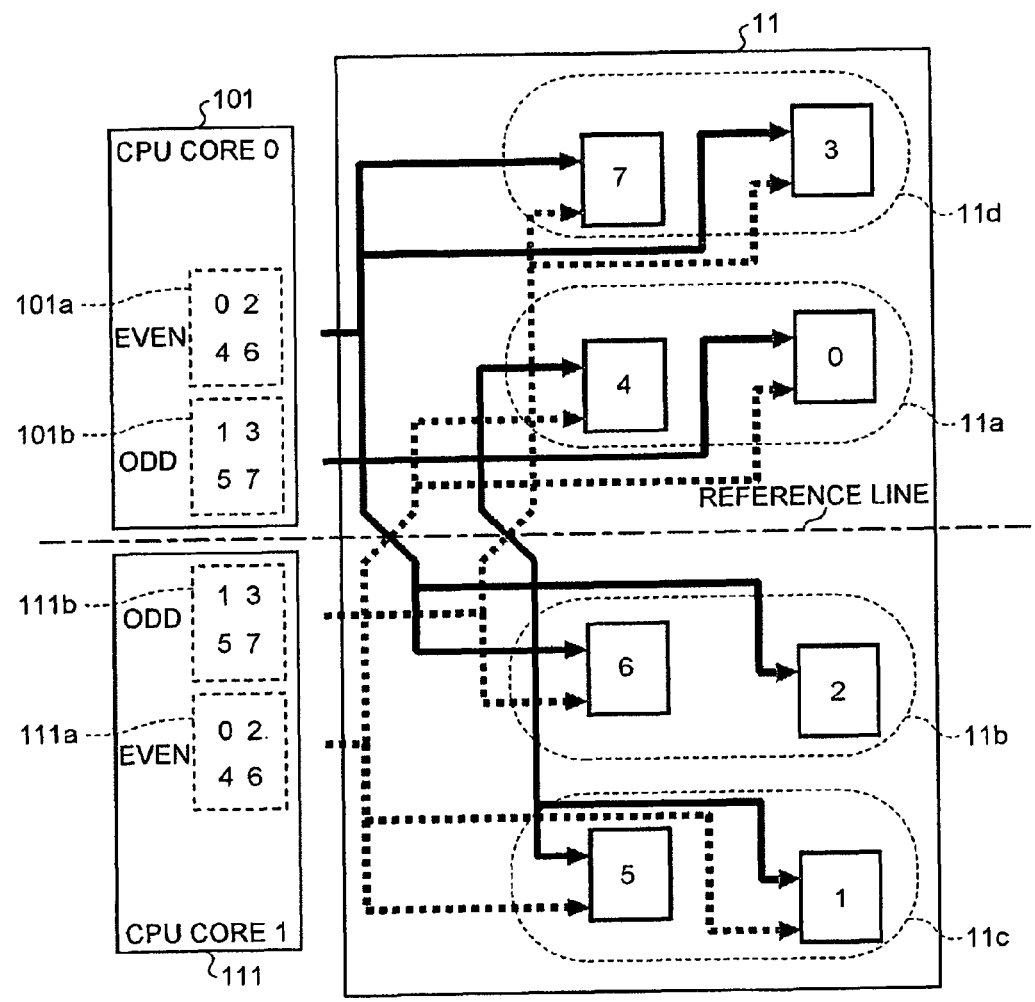
FIG. 2 is a schematic diagram of a buffer device that includes line buffers arranged in a buffer arrangement method according to an embodiment of the present invention.

The buffer arrangement method according to the embodiment is explained below with reference to FIG. 2. FIG. 2 is a schematic diagram of a buffer device 11 that includes line buffers arranged in the buffer arrangement method according to the embodiment.

The line buffers in the buffer device 11 are grouped into four line buffer groups 11a to 11d. Specifically, the even-number line buffer group 201a or 202a of FIG. 5 or FIG. 6 are further subdivided into even-number subgroups 11a and 11b, and the odd-number line buffer group 201b or 202b of FIG. 5 or FIG. 6 are further subdivided into odd-number subgroups 11c and 11d. The even-number subgroups 11a and 11b are arranged on the reference line side, and the odd-number subgroups 11c and 11d are arranged away from the reference line.

In other words, in the buffer device 11 shown in FIG. 2, the odd-number subgroup 11d (buffer 3 and buffer 7), the even-number subgroup 11a (buffer 0 and buffer 4), the even-number subgroup 11b (buffer 2 and buffer 6), and the odd-number subgroup 11c (buffer 1 and buffer 5) are arranged in this order from top to bottom. In the buffer device 11 shown in FIG. 2, the even-number subgroups 11a and 11b are arranged on the reference line side as the CPU cores 101 and 111 are arranged such that their odd-number ports 101b and 111b are on the reference line side. However, if the CPU cores 101 and 111 are arranged such that their even-number ports 101a and 111a are on the reference line side, the odd-number subgroups 11c and 11d of the buffer device 11 can be arranged on the reference line side.

As above, the even-number line buffer group is subdivided into two even-number subgroups, which are arranged symmetrically about the reference line, and the odd-number line buffer group is subdivided into two odd-number subgroups, which are arranged symmetrically about the reference line. Therefore, symmetry is achieved in the wirings connecting the ports and the line buffers about the reference line, so that it is prevented that the difference in length of the wirings among the CPU cores becomes large (see, FIG. 6).

As shown in FIG. 2, the even-number line buffer group including four line buffers is further subdivided into two even-number subgroups of two line buffers each, and the odd-number line buffer group including four line buffers is further subdivided into two odd-number subgroups of two line buffers each. However, the number of line buffers in a line buffer group need not be limited to four, and the number of line buffers in a subgroup need not be limited to two.

Moreover, as shown in FIG. 2, in addition to further subdividing the line buffer groups into subgroups, each of the subgroups of the odd-number line buffer group is arranged at equal distance from the reference line and each of the subgroups of the even-number line buffer group is arranged at equal distance from the reference line.

However, the line buffers can be arranged without subdividing the line buffer groups into subgroups. For example, any two line buffers can be selected from among the even-number line buffers, and the selected line buffers can be arranged symmetrically about the reference line, and all the even-number line buffers can be arranged in this manner. The same can be repeated for the odd-number line buffers, thus eventually obtaining a symmetrical arrangement of the odd-number line buffers and the even-number line buffers about the reference line.

Figure 3:
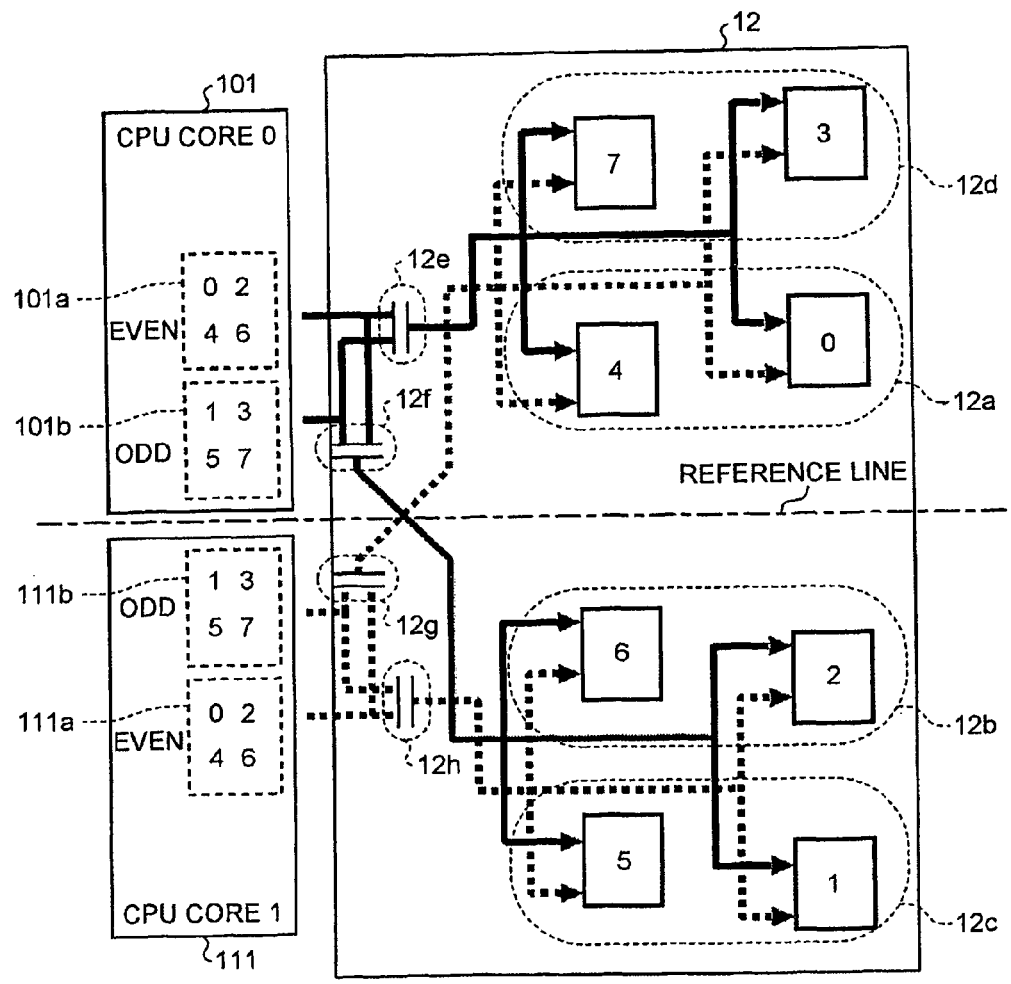
FIG. 3 is a schematic diagram of a buffer device having a wiring switching function according to the embodiment of the present invention.
Figure 4:
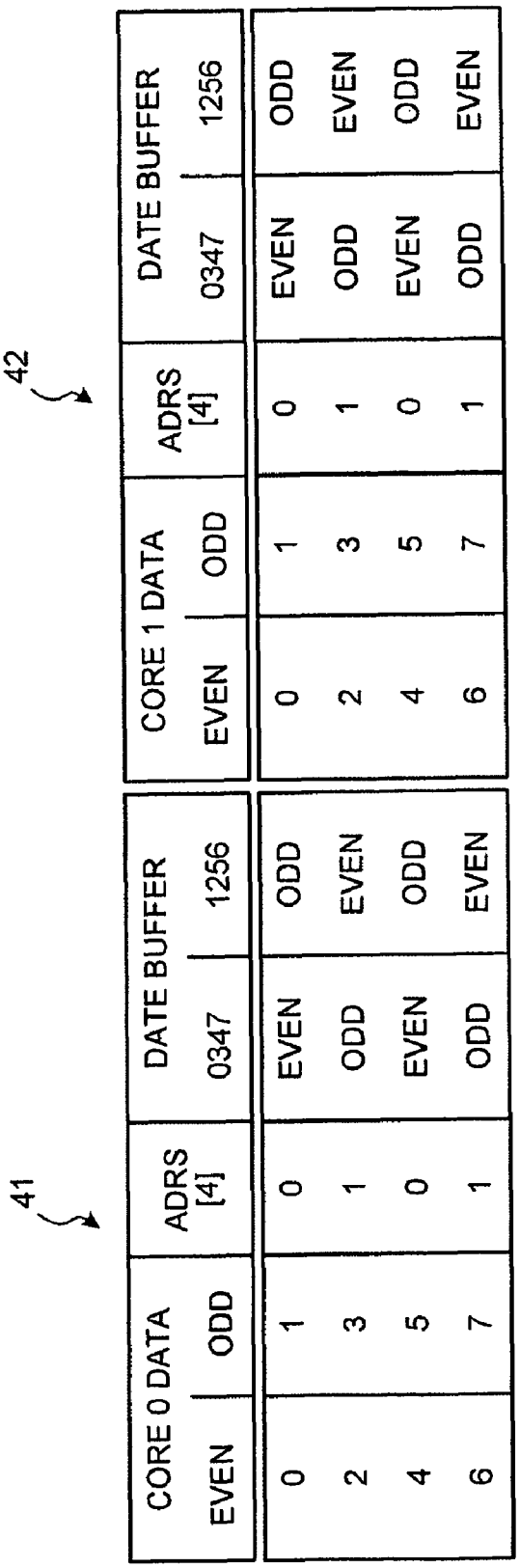
FIG. 4 is a table representing data referred to by the buffer device for switching wirings.

A buffer device 12 obtained by providing a wiring switching function to the buffer device 11 is explained with reference to FIGS. 3 and 4. FIG. 3 is a schematic diagram of the buffer device 12 having the wiring switching function. FIG. 4 is a table representing one example of data referred to by the buffer device 12 for switching the wirings.

As shown in FIG. 3, the buffer device 12 includes wiring switching units 12e to 12h. Subgroups 12a to 12d shown in FIG. 3 correspond respectively to the subgroups 11a to 11d shown in FIG. 2.

Each of the wiring switching units 12e to 12h has two terminals with one wiring connected to one terminal and two wirings connected to the other terminal, and functions as a logical element by performing the operation of switching between the two wirings connected to the other terminal. Thus, the wiring switching units 12e to 12h have the effect of reducing the number of intersections of the wirings on the reference line (that is, the intersections of the solid lines and the dashed lines on the reference line).

Specifically, in the buffer device 11 shown in FIG. 2, there are two intersections of wirings on the reference line. However, the wiring from any single CPU core cannot be valid for both the odd-number line and the even-number line at the same time. Therefore, the number of intersections on the reference line can be made one less by providing the wiring switching units on the wiring.

Thus, the symmetry of the line buffers and the wirings can be preserved without increasing the amount of wiring by providing a wiring switching unit on the wiring connecting each port of every CPU core with each line buffer. An amplifier that is normally provided on the wiring can be configured to function as the logical element performing wiring switching. Thus, the buffer device 12 with a wiring switching unit can be easily realized.

The wiring switching is performed by the wiring switching units 12e to 12h shown in FIG. 3 by referring to a predetermined part of a write data destination address received from the CPU core. The relation between the value of the fourth bit of the write data destination address output from the CPU core 101 (core 0) and the CPU core 111 (core 1) and the switching of the data buffer (line buffer) corresponding to the fourth bit are respectively represented in 41 and 42 of FIG. 4.

As shown in FIG. 4, the destination data buffers (Data Buffer) to which the 64-bit data is output from the CPU cores in units of 16 bytes (8-bytes from each of the odd-number ports and even-number ports) are switched according to the value of the fourth bit of the write data destination address (Adrs).

For example, when data is output to line 0 and line 1 from the CPU core 101 (core 0), as the value of the fourth bit of the write data destination address (Adrs) is 0, the data to be output to the even-number line is switched to the line buffers 0347, and the data to be output to the odd-number line is switched to line buffers 1256. The switching command can be directly given by each CPU core to the buffer device or, alternatively, via an interface unit (not shown) provided adjoining the CPU cores.

In FIG. 4, the number of CPU cores involved is two. However, even if there are more than two CPU cores, and the bus width of the output data path varies, wiring switching can be accomplished by merely changing the address value of the write data destination buffer.

Thus, according to the embodiment, in the buffer device shared by the CPU cores arranged in a symmetrically inverted manner about a predetermined reference line, the even-number line buffer group is further subdivided into two even-number subgroups, which are arranged symmetrically about the reference line, and the odd-number line buffer group is further subdivided into two odd-number subgroups, which are arranged symmetrically about the reference line. This arrangement thus prevents a situation where a line buffer is close to one CPU core but is away from another CPU core. Thus, even if the buffer device is shared by a plurality of CPU cores, the difference in length of the wirings between the CPU cores and the line buffers can be minimized.

Furthermore, the wiring switching unit is provided on the wiring connecting each port of the CPU core with each line buffer to switch the line buffers based on the write data destination address included in the data to be transferred. Consequently, the symmetry of the line buffers and the wirings can be preserved without increasing the amount of wiring.

According to an aspect of the present invention, even when the buffer device is shared by a plurality of CPU cores, the difference in wiring length is minimized.

According to another aspect of the present invention, fast data transfer can be realized.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A buffer device that transfers data and is shared by a plurality of CPU cores arranged in a symmetrically inverted manner about a predetermined reference line, each of the CPU cores breaking up a data block into a plurality of data lines and outputting the data lines via a plurality of ports, the buffer device comprising:

a plurality of line buffers that correspond to the data lines and are connected to the ports in the CPU cores, wherein when the plurality of CPU cores is two CPU cores each of which includes an odd-number port for outputting an odd-number line of the data lines and an even-number port for outputting an even-number line of the data lines as the ports, and the two CPU cores are arranged symmetrically about the reference line, odd-number line buffers connected to the odd-number ports out of the line buffers are arranged symmetrically about the reference line and even-number line buffers connected to the even-number ports out of the line buffers are arranged symmetrically about the reference line, and when the even-number port of each of the two CPU cores is arranged on the reference line side, the odd-number line buffers are arranged on the reference line side, and when the odd-number port of each of the two CPU cores is arranged on the reference line side, the even-number line buffers are arranged on the reference line side.

2. The buffer device according to claim 1, further comprising a wiring switching unit that, when the line buffers are divided into a first group and a second group that include odd-number line buffers and even-number line buffers same in number respectively, switches a wiring that connects each of the first group and the second group to the odd-number port and the even-number port of each of the two CPU cores to one of the first group and the second group for data transfer.

3. The buffer device according to claim 2, wherein the wiring switching unit switches the wiring based on a write destination address contained in the data output from the CPU cores.

4. A buffer arrangement method for a buffer device that transfers data, is shared by a plurality of CPU cores arranged in a symmetrically inverted manner about a predetermined reference line, each of the CPU cores breaking up a data block into a plurality of data lines and outputting the data lines via a plurality of ports, and includes a plurality of line buffers that correspond to the data lines and are connected to the ports in the CPU cores, wherein when the plurality of CPU cores is two CPU cores each of which includes an odd-number port for outputting an odd-number line of the data lines and an even-number port for outputting an even-number line of the data lines as the ports, and the two CPU cores are arranged symmetrically about the reference line, the buffer arrangement method comprising:

arranging odd-number line buffers connected to the odd-number ports out of the line buffers symmetrically about the reference line;

arranging even-number line buffers connected to the even-number ports out of the line buffers symmetrically about the reference line;

arranging the odd-number line buffers on the reference line side when the even-number port of each of the two CPU cores is arranged on the reference line side; and arranging even-number line buffers on the reference line side when the odd-number port of each of the two CPU cores is arranged on the reference line side.

5. The buffer arrangement method according to claim 4, further comprising switching, when the line buffers are divided into a first group and a second group that include odd-number line buffers and the even-number line buffers same in number respectively, a wiring that connect each of the first group and the second group to the odd-number port and the even-number port of each of the two CPU cores to one of the first group and the second group for data transfer.

6. The buffer arrangement method according to claim 5, wherein the switching includes switching the wiring based on a write destination address contained in the data output from the CPU cores.

7. An information processing apparatus comprising:
a buffer device that transfers data, is shared by a plurality of CPU cores arranged in a symmetrically inverted manner about a predetermined reference line, each of the CPU cores breaking up a data block into a plurality of data lines and outputting the data lines via a plurality of ports, and includes a plurality of line buffers that correspond to the data lines and are connected to the ports in the CPU cores, wherein when the plurality of CPU cores is two CPU cores each of which includes an odd-number port for outputting an odd-number line of the data lines and an even-number port for outputting an even-number line of the data lines as the ports, and the two CPU cores are arranged symmetrically about the reference line, odd-number line buffers connected to the odd-number ports out of the line buffers are arranged symmetrically about the reference line and even-number line buffers connected to the even-number ports out of the line buffers are arranged symmetrically about the reference line, and when the even-number port of each of the two CPU cores is arranged on the reference line side, the odd-number line buffers are arranged on the reference line side, and when the odd-number port of each of the two CPU cores is arranged on the reference line side, the even-number line buffers are arranged on the reference line side.

* * * * *